J. W. JARBOE.

Paper-Barrel.

Reissued June 29, 1875.

No. 6,515

WITNESSES

Nelle W. Leggett.

R. W. Barr,

INVENTOR

John W. Jarboe.

By Leggett & Leggett

Attorneys

THE GRAPHIC CO. PHOTO-LITH. 39 & 41 PARK PLACE, N.Y.

UNITED STATES PATENT OFFICE.

JOHN WILLIAM JARBOE, OF GREEN POINT, NEW YORK, ASSIGNOR, BY MESNE ASSIGNMENTS, TO J. F. SEIBERLING, TRUSTEE.

IMPROVEMENT IN PAPER BARRELS.

Specification forming part of Letters Patent No. 76,771, dated April 14, 1868; reissue No. 6,515, dated June 29, 1875; application filed June 9, 1874.

*To all whom it may concern:*

Be it known that I, JOHN W. JARBOE, of Green Point, county of Kings and State of New York, have invented certain new and useful Improvements in Paper Barrels, of which the following is a full, clear, and exact description, reference being had to the accompanying drawings making part of this specification, in which—

Figure 1:
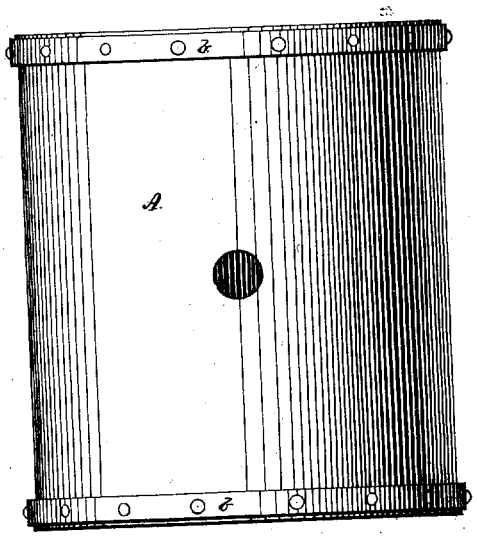
Figure 2:
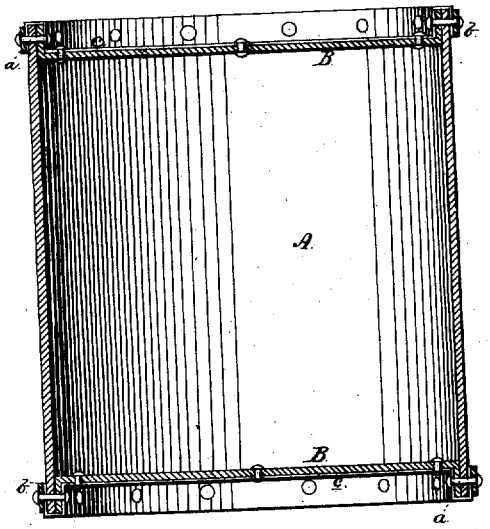

Figure 1 represents an external side view of my improved cask, and Fig. 2 is a longitudinal section of the same.

The invention consists in the production, as a new article of manufacture, of a cask or barrel, or other vessel of similar nature, made of paper, and it will readily be understood by stating that to make such vessel I take paper, either in roll or sheets, or in form of pulp or stock, as it comes from the paper-mill, and wrap it round a suitable former, or, when making it directly from the pulp, compress it in a mold to make or build up the body A of the cask.

When made from sheets of paper, the same may be cemented together by a mixture of glue and flour, or other suitable adhesive material.

If using pulp, and pressing it in a mold, one of the heads B may also be simultaneously formed in the end of the body; but it is preferred to make the heads separately, and to fit them to their places. These heads are in the form of disks of any desired thickness of paper, with their edges turned up or out, so as to constitute rims of a diameter to fit the ends of the body; and after they are put in place, bands or hoops *b* may be applied on the outside to secure the body and head by rivets or other fastenings passing through the bands, body, and ends, and rims *a*, or any other equivalent mode of fastening in or on the head, may, if preferred, be adopted, and any suitable configuration may be given to the edges of the said heads to conform to the mode adopted for securing them. The heads may be made with their edges turned up or out to constitute rims *a*, as shown.

The paper of which these casks are made may be of a chemically-prepared character, or may be coated with chemical matter to resist the deleterious effects of the contents of the cask on the paper, and to make it yet closer or water-proof. Thus the paper may be saturated or coated with paraffine, resin, linseed-oil, or other material, according to the substance the cask is designed to contain.

Paper, as a material thus used, forms a very close and light cask, and for many purposes of sufficient strength without incasing the same with a stiffer material; but where desired to give additional strength, an outer covering of wood, metal, or other suitable material may be applied thereto, or the heads only may be so covered, as shown at *c*. These paper casks are not affected by changes of temperature, as are wood or metal ones, are proof against leakage, and may be made non-absorbent.

Having now described the invention, what is claimed as new, and sought to be secured by Letters Patent, is—

1. A cask or barrel made of paper, as a new article of manufacture.
2. The body or cylinder of a cask or barrel made of paper, in combination with heads or ends, and stiffening bands or hoops applied thereto, substantially as described.
3. The heads of the barrel made of paper, and provided with flanges or rims for stiffening and strengthening the heads, and for uniting the same to the ends of the body or cylinder, as described.
4. The body of a cask or barrel made of paper, in combination with heads of stiffer material.

J. W. JARBOE.

Witnesses:
A. V. BRIESEN,
J. F. SEIBERLING.